J. F. WINCHELL,

Assignor to P. P. MAST & Co.

Seeding-Machines.

No. 7,926. Reissued Oct. 23, 1877.

Witnesses:

Donn P. Turtchell.

Will M. Dodge.

Inventor:

P. P. Mast & Co.

assignees of

J. F. Winchell.

By Dodgerton

Attys.

UNITED STATES PATENT OFFICE.

JAMES F. WINCHELL, OF SPRINGFIELD, OHIO, ASSIGNOR TO P. P. MAST & CO., OF SAME PLACE.

IMPROVEMENT IN SEEDING-MACHINES.

Specification forming part of Letters Patent No. 155,562, dated September 29, 1874; Reissue No. 7,926, dated October 23, 1877; application filed September 27, 1877.

*To all whom it may concern:*

Be it known that I, JAMES F. WINCHELL, of Springfield, in the county of Clarke and State of Ohio, have invented certain new and useful Improvements in Grain-Drills; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to grain-drills; and the invention consists in a novel construction and arrangement of the feeding devices, whereby the quantity of grain fed out may be regulated at will, by means of adjustable gates or gages, and by which also the said gates or regulating devices can be separately adjusted so as to adapt them to their respective feed wheels and cups, and can all be operated simultaneously, as hereinafter more fully set forth.

Figure 1:
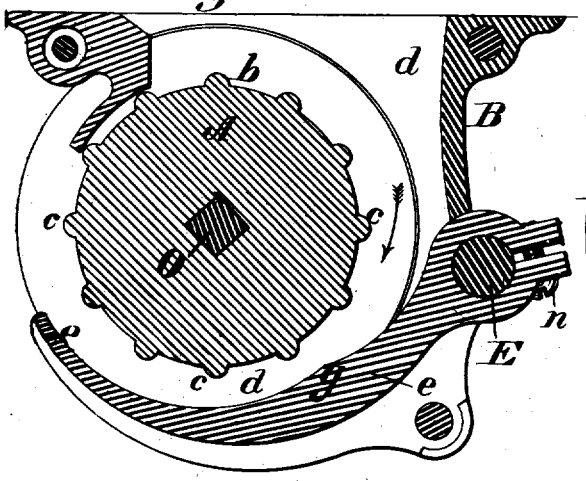
Figure 2:
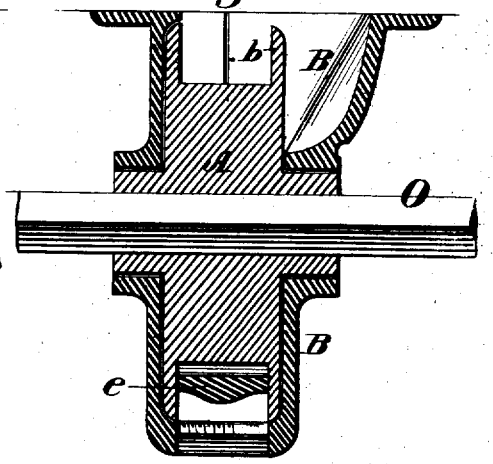
Figure 3:
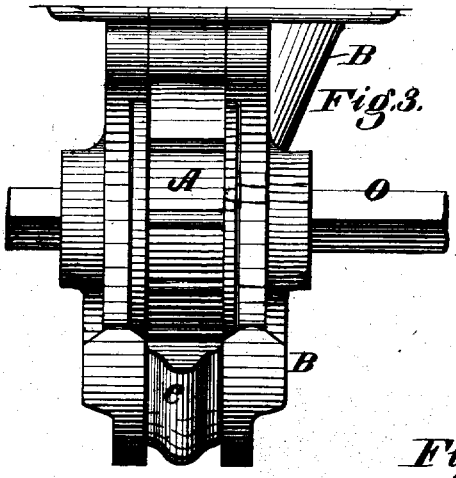
Figure 4:
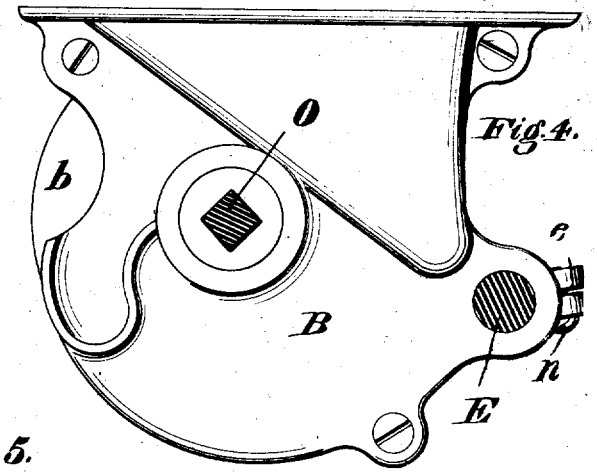
Figure 5:
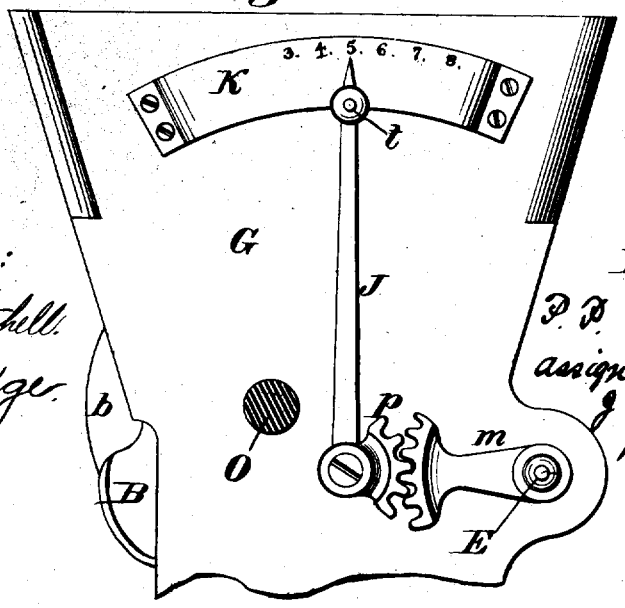

Figure 1 is a vertical section through the center of one of my improved feeding devices; Fig. 2, a transverse vertical section, taken at right angles to Fig. 1; Fig. 3, a rear elevation of the same; Fig. 4, a side elevation, and Fig. 5 is an end view of the hopper of the machine, showing an index-lever for operating the gates or regulating devices, and indicating the amount of grain per acre which the machine may be set to sow.

A represents the feed-wheel, made of a circular form, with flat sides, and a rectangular reeess or groove around its edge or periphery, the sides of the groove being formed by the radial flanges or rims *b* extending outward from the body of the wheel, as shown in Figs. 1 and 2. The face of the wheel, at the bottom of the circumferential groove, is provided with transverse ribs or teeth *c*, to assist in feeding out the grain.

While I consider the above-described wheel the most suitable for use in connection with my regulating device, other styles of wheel may be used. For example, wheels having their grooves of a semicircular or V form in cross-section, or without any groove, and with or without the transverse ribs or teeth, may be used, and the regulating device made to operate the same.

B represents a cup or case, in which the wheel is mounted in a vertical position, as is usual, it being operated or made to rotate by a shaft, O, which extends lengthwise under the hopper, and passes through the entire series of feed-wheels, whatever their number may be. This cup is made of such a form as to inclose and fit the wheel, and has its top made open and of a flaring or hopper-like form, to receive the grain from the hopper above and guide it down against the front edge of the wheel, as usual in this class of machines. The sides of the cup fit closely to the sides of the wheel, but a space or passage, *d*, as shown in Fig. 1, is made in front of and under the wheel, for the passage of the grain, which is carried down through this space, and forced out through an opening at the rear of the wheel.

The amount of grain discharged at any given rate of speed of the wheel will depend upon the size of this outlet or opening, and, in order to permit or enable the rate of speed to be increased or decreased without changing the speed of the wheel, I provide a gate or gage, *e*, which, in this case, serves as the bottom of the cup or case B, and make it movable, so that the space through which the grain is fed out may be increased or decreased at will, and the flow of the grain be thereby regulated or entirely stopped, as may be desired. This adjustment of the regulating device may be made in a variety of ways. In this instance, I have made the sides of the case B flat, and have pivoted the gate or regulating device *e* between the sides of the case, as shown in Figs. 1, 2, and 3. The pivot in this case is located at the front of the wheel, and is a rock-shaft, E, extending the entire length of the machine, and giving support to the entire series of gates *e*, so that by turning this shaft they will all be moved simultaneously and uniformly, and thereby regulate the feed of all the wheels precisely alike, and at one operation, with great nicety.

In order to avoid the possibility of there being any difference in the movement of the several gates *e*, I secure them all directly to the rock-shaft E, as shown in Figs. 1 and 2, in such a manner that they can be made rigid thereon, after they have been mounted and properly adjusted. It is necessary that they shall be made adjustable upon their rock-shaft, in order that each one may be so adjusted in relation to the wheel as to make the passage for the grain perfectly uniform in the whole series, so that each wheel of the series shall feed out the same quantity of grain, and so that they may be adjusted laterally also to fit them accurately to the positions of the several cases. This adjustment of the gates on their rock-shaft may be provided for by any well-known mechanical means. As represented in Figs. 1 and 4, they are shown as having that portion which encircles the shaft E provided with a slit or opening, and having a set-screw, *n*, inserted through their projecting ends, by which the parts can be drawn together, and thus made to clamp the shaft with sufficient force to hold them rigid thereon. By loosening the screw *n* the gates *e* can each be adjusted separately on the shaft, as may be desired. The gates *e* have on their upper faces a raised point or inclined projection, *g*, which always stands nearer the edge or face of the wheel than any other portion of the gate, and serves as a gage-point or cut-off, and in this case is the part which controls the feed. The parts are so shaped that the feed passage or space *d* decreases in width fore and aft until it reaches the point *g*, and from thence to the delivery-point slightly increases in order to give the grain a free escape or clearance after it passes the gage-point *g*.

In the present instance the gate *e* is arranged to swing up into the recessed or grooved edge of the feed-wheel, as shown in Fig. 2. This may or may not be the case, it depending upon the particular style or form of wheel used.

The rock-shaft E on which the regulating gates *e* are mounted extends the entire length of the series of feed-wheels, and at one end it projects out past the end of the grain-hopper G, and has secured to its end an arm, *m*, which is provided at its opposite extremity with a toothed segment, which gears into a smaller segment, *n*, attached to a pivoted lever, J, on the end of the hopper, so that by moving the lever J the gates may all be operated or moved as desired. As shown in Fig. 5, an index-plate, K, is secured to the hopper in such a position that the end of lever J shall sweep along the face of the same when moved, this index-plate K having thereon marks or figures to indicate the quantity of grain sown, or rather to show where to set the index-lever, so as to cause the drill to deposit any desired quantity of grain per acre. This index-plate K is arranged in such a manner that there is a space under its edge, and the lever J is provided with a thumb-screw and clamping-nut, *t*, by which the lever J may be locked fast at any desired point, and thus prevent any accidental moving of the gates *e*.

The reason for connecting the regulating-lever J to the rock-shaft E by means of intermediate devices instead of directly, is that a comparatively small movement of the gates *e* will make a material difference in the quantity of grain discharged; and it is preferred to use the intermediate arm M and the segment-racks, as by so doing a much greater movement of the lever J is required to give to the gates a given movement, and hence the gates can thereby be adjusted or set with greater accuracy. It also enables the figures or indicating marks on the index-plate K to be placed at greater distances apart, or to have a greater number of such marks arranged thereon, thus enabling the machine to be so adjusted as to vary by smaller quantities the amount of grain used.

As before stated, the main feature of my invention consists in the means of varying at will the size of the grain passage or space, which may be accomplished in various ways; and therefore I do not desire to understood as limiting myself to the special construction and arrangement described.

It is obvious that instead of having the regulating-gates arranged to swing from a center, as shown, they may be arranged to slide to and from the wheel or grain-passage, and that any suitable mechanical devices may be used to operate them.

It is also obvious that they may be varied in form to adapt them to different wheels, and that, if desired, the whole lower portion of the case may be made in one piece, and arranged to move so as to accomplish the same result. The form of the cup and the gate or regulating device will necessarily depend upon the form of the wheel used, and this, as before stated, may be varied, as desired. The form of wheel shown is believed to be a good one, as its face and flanges afford a large moving or carrying surface to feed out the grain, and it will work with uniformity, whether the machine stands horizontally or in an inclined position, as it sometimes must, when traveling along a hill-side, where one wheel will be higher than the other. It will, of course, be understood that motion will be imparted to the feed-wheels by connecting their shaft O directly or indirectly with one of the supporting-wheels of the machine, in any desired manner, as is usual in grain-drills.

By constructing and arranging the parts substantially as described, I produce a feed which is cheap and simple, which is certain and uniform in its operation, and which enables the feed to be increased or diminished to any required extent instantly, and without any change of gear or varying the speed of the feed-wheels, and which is also adapted for all kinds of grain.

Having thus described my invention, what I claim is—

1. A feed for grain-drills, consisting of a series of feed-wheels and cases, and a corresponding series of gates or regulating devices, constructed and arranged to be operated simultaneously, whereby the discharge-passages for the grain may be varied at will, substantially as described.

2. In combination with a feed wheel and case of a grain-drill, a gate or regulating device secured direct to a rock-shaft, whereby the same may be operated at will, as set forth.

3. In a grain-drill feed, the gates or regulating devices, adjustably secured to a rock-shaft, so that each may be adjusted in relation to its wheel or cup, substantially as set forth.

4. In combination with a feed wheel and case or cup, the adjustable gate or section *e*, located so as to form the bottom of the case over which the grain is fed by the wheel, as set forth.

5. The adjustable gates or regulating devices, provided with a projection, *g*, arranged, in relation to the wheel, substantially as described, whereby the space at that point through which the grain is fed is made smaller than at any point in rear of the same, as set forth.

6. In combination with the series of gates or devices arranged to regulate the size of the discharge-passages in the seed cups or wheels, a lever and index-plate arranged to operate, substantially as described, for setting the gates and indicating the quantity of grain discharged, as set forth.

7. In combination with the rock-shaft E, having the series of gates or regulating devices attached thereto, the lever *m* and the lever J, arranged to operate substantially as and for the purposes set forth.

JAMES F. WINCHELL.

Witnesses:
T. I. THOMPSON,
O. B. JOHNSON.